Dec. 1, 1931. T. F. LILLY 1,834,626
FLUID ACTUATED CLUTCH AND TRANSMISSION MECHANISM
Filed Dec. 14, 1927   3 Sheets-Sheet 3

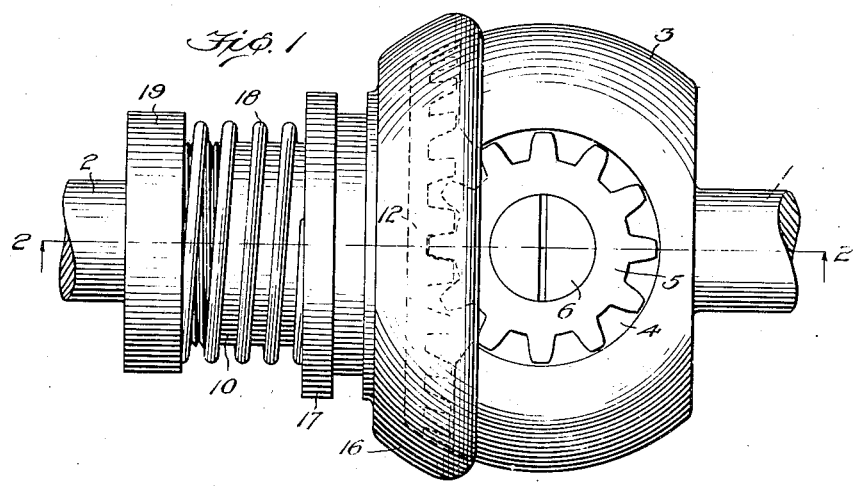
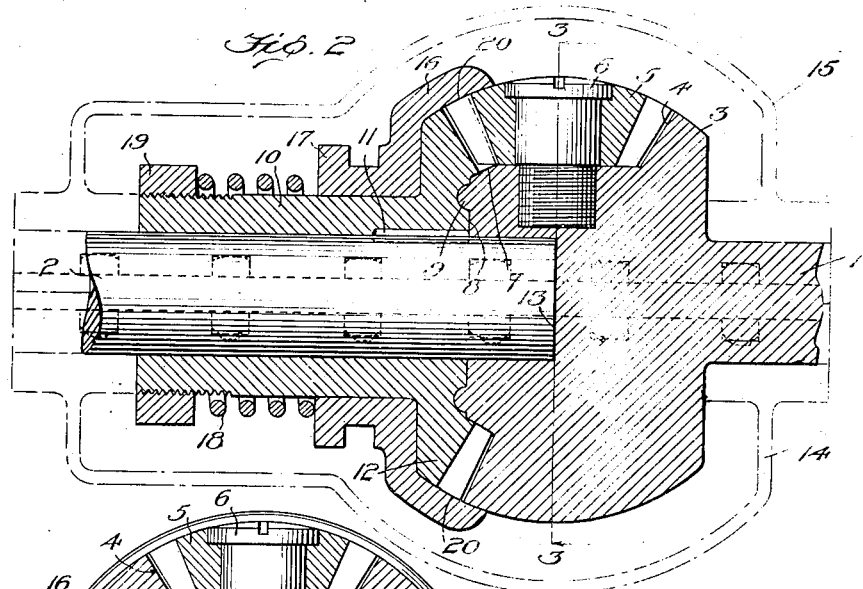
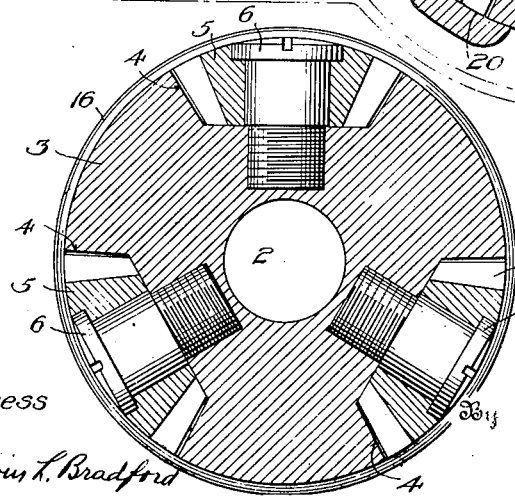

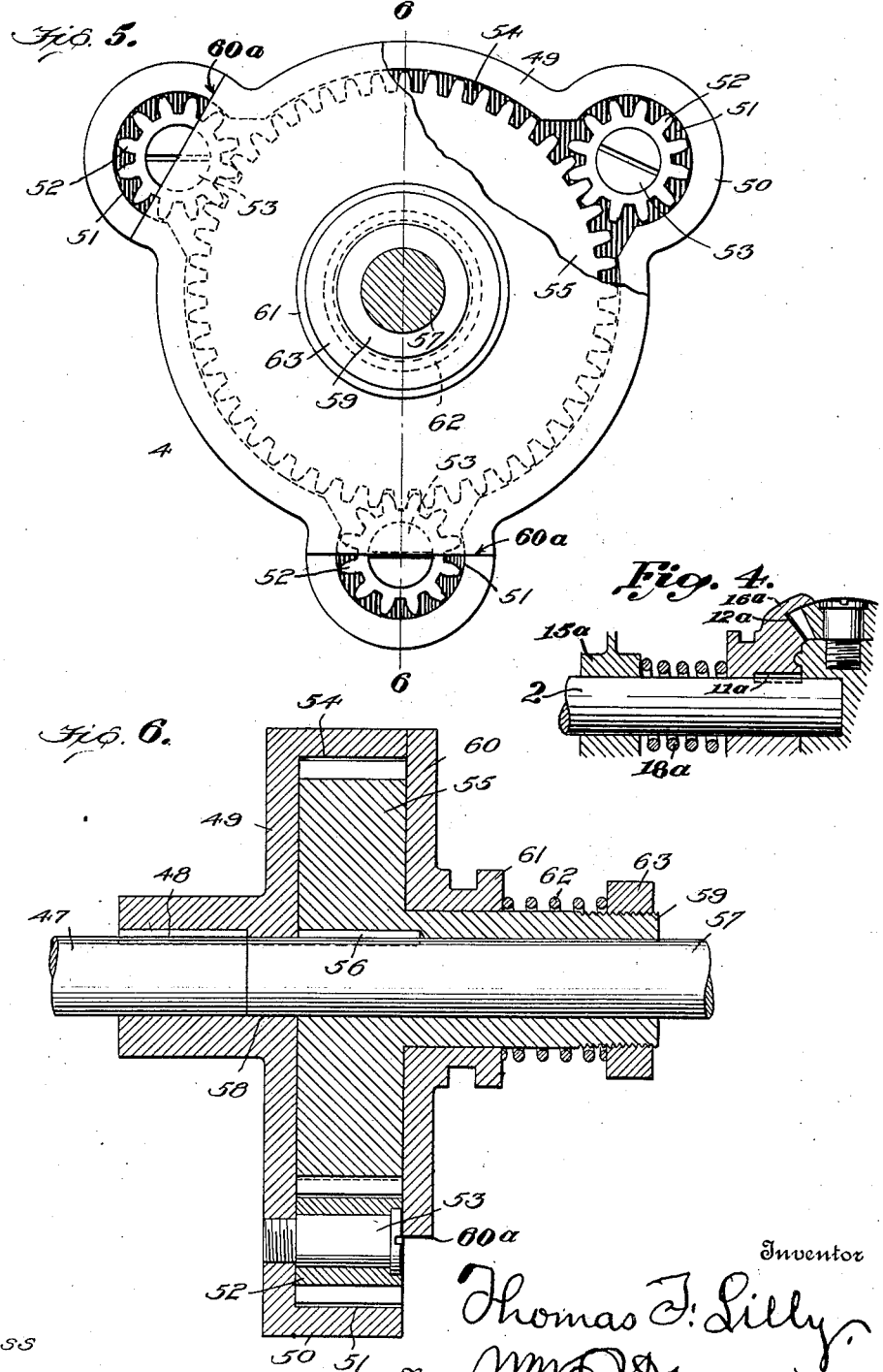

Inventor
Thomas F. Lilly
By Wm. E. Dyne
Attorney

Patented Dec. 1, 1931

1,834,626

UNITED STATES PATENT OFFICE

THOMAS F. LILLY, OF MEMPHIS, TENNESSEE

FLUID-ACTUATED CLUTCH AND TRANSMISSION MECHANISM

Application filed December 14, 1927. Serial No. 240,004.

This invention relates to improvements in hydraulic clutches and transmission mechanism, and more particularly to a novel combination clutch and transmission mechanism especially adapted for use in motor vehicles.

Prior to the present invention, hydraulic clutches and power transmission means were known in which the clutching or speed changing action was controlled by throttling oil or the like in a conduit. The present invention makes use of this principle, but includes specific means which are an improvement over the known structures. In this improved mechanism, the oil or the like is allowed to flow into meshing gears, and the discharge of the oil is positively controlled directly at the point of exit of the fluid from the gears in such manner as to either lock the gears together or to allow them to rotate at varying speeds relatively to one another.

Another object of the invention is to provide a mechanism of this character in which the driving element is provided with a number of pinions which mesh with a single large pinion on the driven member.

The ejection of oil from the meshing gears is regulated by a manually controlled cup or the like. In this device the parts are machined so as to permit snug fitting, so as to prevent the oil from travelling to places where the oil is not needed or desired.

With the foregoing objects outlined, and with other objects in view, which will appear as the description proceeds, the invention consists of the novel features hereinafter described in detail, illustrated in the accompanying drawings, and more particularly pointed out in the appended claims.

Referring to the drawings:

Figure 1 is a top plan view of the combined clutch and transmission device, illustrated with the casing removed.

Figure 2 is a vertical sectional view of the same taken on line 2—2 of Figure 1 and showing the casing in dotted lines.

Figure 3 is a transverse vertical sectional view taken on line 3—3 of Figure 2.

Figure 4 is a detailed vertical sectional view showing a modified arrangement of certain parts shown in Figure 2.

Figure 5 is a front elevation, partly broken away, of a modification of the clutch and transmission mechanism.

Figure 6 is a sectional view on line 6—6 of Figure 5.

Figure 7:
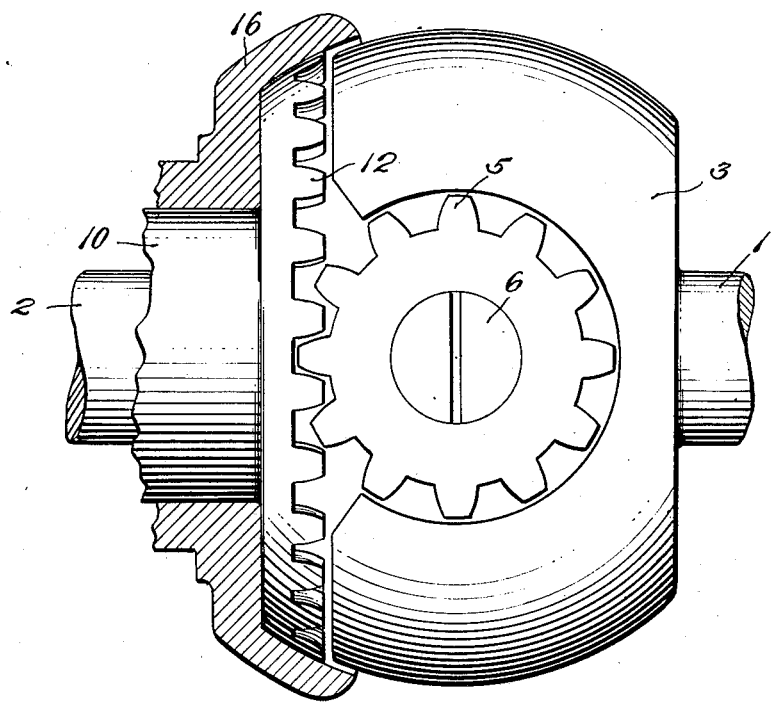

Fig. 7 is a relatively enlarged detail of the top plan view of Fig. 1 with a portion of the cup 16 broken away and showing on an exaggerated scale the lax fitting of parts 5 and 12.

Figure 8:
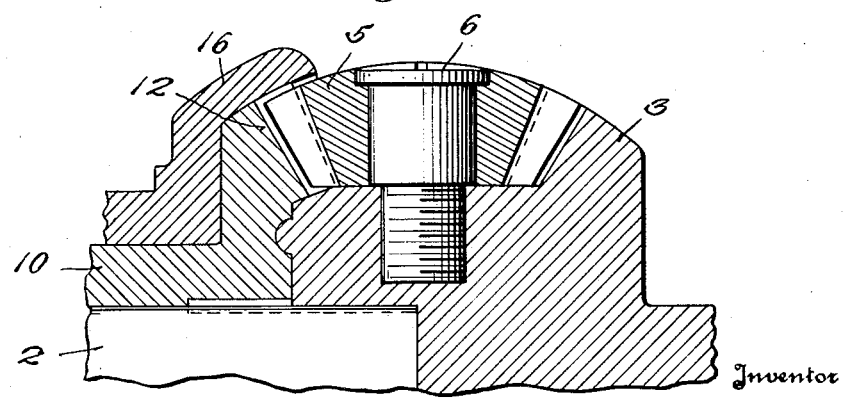

Fig. 8 is a relatively enlarged detail of the vertical sectional view of Fig. 2 showing on an exaggerated scale the lax fitting of parts 5 and 16.

In the drawings, 1 designates the driving shaft of an automobile or the like, and 2 the propeller or driven shaft.

In this form of the invention the driving shaft is provided at its rear end with an enlargement 3, having on its periphery a number of cavities 4, each preferably of frusto-conical shape, with its rear end open, for a purpose hereinafter described. A conical pinion 5 is arranged in each of these cavities, and is preferably held in position by a screw 6. Each pinion is rotatably mounted on its respective screw and closely fits in the cavity in such manner that it is just free to rotate.

A frusto-conical surface 7 is provided at the rear end of the enlargement, and merges into a flat surface 8 provided with an annular ridge 9 which is semi-circular in section.

A sleeve 10 is fixed to the driven shaft 2 by any suitable means, such as a key 11, and the sleeve is provided at its forward end with a gear 12, which meshes with the pinions 5. The gear has its front face machined to conform to the surfaces 7, 8 and 9 of the enlargement 3, and this snug engagement prevents oil from working inwardly toward the shaft 2.

It will be observed that the teeth of the gear 12 are beveled so as to neatly fit or engage with the teeth of the pinions 5, and it will be noted that the inner ends of the teeth of the gear 12 snugly engage the frusto-conical surface 7 of the enlargement.

In this form of the invention the shafts are aligned, and the front end of the shaft 2 rotates in a socket 13 provided in the rear end of the enlargement 3.

All of this mechanism is arranged to rotate in a casing 14 having a removable cover or upper half 15 bolted or otherwise secured to its lower half, and the parts will be submerged in oil or the like contained in the casing. It will therefore be seen that as the shaft 1 rotates oil will flow into the cavities 4 and will be moved by the teeth of the pinions 5 toward the teeth of the gear 12. If no means are provided to prevent the oil from being ejected from between the teeth, the pinions 5 will simply ride on the gear 12 without rotating the driven shaft 2.

In order to make a combined clutch and transmission out of such mechanism, I provide an oil confining cup 16, which, when in the position shown in Figures 1 and 2, neatly fits the peripheries of the parti-spherical enlargement 3 and the sleeve 10 and overlaps the line along which said parts meet. Furthermore, the cup 16 surrounds the points where the pinions mesh with the gear, and consequently any oil moved into the spaces circumscribed by the pinion and the gear teeth and by the surfaces 7 and the cup 16 is trapped, with the result that the pinions can no longer ride in the gear 12, but the gear must rotate with the shaft 1. In this way the cup 16, when combined with the mechanism, converts the same into a clutch.

For the purpose of making such a mechanism a speed-changing structure as well as a clutch, the cup 16 is mounted for axial movement along the shaft 2. For this purpose the clutch is integral with a collar or spool 17 that slides on the sleeve 10 and may be actuated by the fork or the like of any suitable control lever (not shown).

A coiled spring 18 surrounds the sleeve 10 and normally urges the cup 16 forwardly, and this spring bears at its rear end against a nut 19 which is threaded on the sleeve to permit adjustment for varying the tension of the spring.

It will be apparent to those skilled in the art that when the cup 16 is moved slightly rearwardly the oil moving in between the meshing teeth of the pinions and gear will be permitted to escape at the point 20, and the size of the clearance space at this point will determine the relative speeds of the two shafts. For instance, we will assume that the cup 16 is moved rearwardly one-sixteenth of an inch. This will cause the shaft 2 to follow the movement of the shaft 1, but at a slower speed. On the other hand, if the cup 16 is moved rearwardly a slightly greater distance the shaft 2 will also follow the movement of the shaft 1, but at a still slower speed, and so on. Of course, when the cup 16 is moved to a point where it no longer confines the fluid, the pinions 5 will roll on the gear 12 without actuating the shaft 2.

In the embodiment of the invention illustrated in Figures 5 and 6 the construction is quite similar to that shown in Figures 1, 2 and 3, but differs mainly therefrom by the employment of spur gears instead of bevel gears. In this form of the invention the driving shaft 47 imparts by means of the key 48 rotation to a substantially triangularly shaped pan 49. This pan is provided with protuberances 50 forming auxiliary cavities 51 in which spur gears 52 rotate on screw shafts or the like 53. The pan also has a main cavity 54 to receive a large spur gear 55 which has its teeth meshing with the teeth of the pinions 52. The gear 55 is keyed at 56 on a driven shaft 57 which has one of its ends journaled in the pan 49, as shown at 58.

Projecting from the gear 55, and preferably integral therewith, is a sleeve 59 on which is slidably mounted a confining disk 60 of substantially the same shape in plan as the pan 49 except that it does not extend to cover the entire area of the cavities 51, but terminates as at 60a, leaving approximately half of each of the cavities uncovered. This disk or plate 60 has a spool 61 at its center to receive the fork of the control lever (not shown). In this embodiment also, a coiled spring 62 is used for urging the plate 60 toward the pan, and a nut 63 is arranged on the sleeve to vary the tension of the spring.

In the operation of this device, the oil surrounding the parts will flow into the cavities 51 and 54, and if the plate 60 is spaced a sufficient distance from the pan, the pinions 52 will simply ride on the gear 55 without rotating the latter. However, when the plate is moved toward the pan to the proper point, the oil can not escape from between the pan 49 and plate 60 as fast as it enters the spaces between the teeth of the meshing gears, and consequently the shafts will then rotate together, but the shaft 57 will travel at slower speed than the shaft 47.

In actual practice, I prefer to use four of the pinions 5, in the embodiment of my invention shown in Figs. 1, 2 and 3, as I have found that the additional pinion adds more power and efficiency.

I have also found in using the mechanism that it is desirable to allow a certain amount of escapement or leakage between the parts to cause automatic reductive transmission as the load increases or decreases. This can be provided by the lax fitting of either of the following parts, viz., the fluid confining cup 16, the gear 12, the pinions 5, or the enlarged end of the driving shaft 3, or by cutting escapement grooves in any or all of said parts.

The degree of looseness best adapted to any given embodiment of my invention will depend upon the size of the parts used, their speed of rotation, the viscosity of the oil used, the amount of the load to be carried, and other factors, so that it is not practicable to prescribe a fixed degree of looseness which will make for maximum efficiency in every clutch and transmission mechanism constructed according to the principles of my present invention. I have found, however, that when the parts are machined with ordinary care they fit too tightly to give the benefit of automatic reductive transmission, so that in all cases where this feature is desired it will be necessary to purposely assemble the parts to fit with a greater degree of looseness than would characterize a structure whose elements were machined with ordinary care, thus inducing a rate of leakage of the fluid which is relatively high for the kind and size of parts used.

Figs. 7 and 8 show this lax fitting on a scale which is exaggerated for purposes of illustration. Thus, in Fig. 7 an exceedingly loose fitting is shown in the meshing of the pinion 5 and gear 12; while in Fig. 8 the cup 16 and pinion 5 are shown spaced away with exaggerated clearance. In actual practice the clearance between the loose fitting parts will not be as great as shown in Figs. 7 and 8, but will be appreciably greater than that occurring between ordinarily accurately machined parts. In the claims this appreciably greater degree of clearance will be described as "excessive".

It may be seen that the periphery of the part 3, the outer surfaces of the pinions 5, and the outer surface of the rim of the gear 12 have parti-spherical surfaces. This permits a true and close fitting of the fluid confining case or cup 16 to the outer surfaces or rim of the gear, pinions and carrier, while gear and pinions revolve at angles to each other.

By using bevel gearing for the parts 5 and 12, said parts will constantly wear to a better fit, and consequently the mechanism will last indefinitely.

In some instances I may make the parts 16 and 12 integral as shown at 16a and 12a in Fig. 4 or connect the same together in such manner that they may be simultaneously shifted. Of course, in such instance the other parts would have to be correspondingly altered to permit this unitary movement of the parts 12a and 16a. One manner of accomplishing the desired result is illustrated in Fig. 4, where the parts 76a and 12a are splined on the shaft 2 at 11a and are urged forward by the spring 18a which bears against the casing 15a.

From the foregoing it is believed that the construction, operation and advantages of the invention may be readily understood by those skilled in the art, and it is apparent that the mechanism disclosed may be used in many different environments and the details thereof may be varied without departing from the spirit of the invention as expressed in the claims.

What I claim and desire to secure by Letters Patent is:

1. In mechanism of the character described, a driving member, a driven member, a rotatable pinion carried by one of said members, a gear meshing with said pinion and operatively connected with the other member, and adjustable fluid-confining means arranged at the point where the teeth of the pinion and the gear mesh, for limiting the exit of the fluid at said point, said gear and one of said members being provided with annular faces snugly engaging each other, one of said faces having an annular ridge and the other having an annular groove to receive such ridge.

2. In mechanism of the character described, a driving member, a driven member, a rotatable pinion carried by one of said members, a gear meshing with said pinion and operatively connected with the other member, and adjustable fluid-confining means arranged at the ends of the teeth of the pinion and the gear, for limiting the exit of the fluid at said point, the fluid-confining means consisting of a movable cup embracing said gear.

3. In mechanism of the character described, a driving member and a driven member, one of said members having peripheral cavities each open at one end, pinions rotatably mounted in said cavities and having their teeth projecting through the open ends of the cavities, a gear connected to the other member and having its teeth engaging the teeth of the pinions, and a plate slidable axially relatively to one of said members and adapted to overlap the points where the pinions mesh with said gear.

4. In mechanism of the character described, a driving member and a driven member, one of said members having peripheral cavities each open at one end, pinions rotatably mounted in said cavities and having their teeth projecting through the open ends of the cavities, a gear connected to the other member and having its teeth engaging the teeth of the pinions, and a plate slidable axially relatively to one of said members and adapted to overlap the points where the pinions mesh with said gear, annular faces on one of said members and on said gear, said faces snugly engaging each other and consisting of straight and frusto-conical portions.

5. In mechanism of the character described, a driving member and a driven member, one of said members having peripheral cavities each open at one end, pinions rotatably mounted in said cavities and having their teeth projecting through the open ends of the cavities, a gear connected to the other member and having its teeth engaging the teeth of the pinions, a plate slidable axially relatively to one of said members and adapted to overlap the points where the pinions mesh with said gear, and means for normally urging said plate towards said gear.

6. In mechanism of the character described, a driving member and a driven member, one of said members having peripheral cavities open through one end thereof, pinions rotatably mounted in said cavities and projecting through the open ends of the latter, a gear connected to the other member and meshing with said pinions, a movable plate embracing the gear and overlapping the line where the gear and pinions mesh, and means for urging said plate toward said gear.

7. In mechanism of the character described, a driven member having peripheral cavities of frusto-conical shape opening through one end of said member, said end having a frusto-conical surface, a gear connected to the other member and having beveled teeth meshing with the teeth of said pinions, the inner ends of the teeth of the gear snugly engaging said frusto-conical surface, and a fluid-confining element embracing said gear and overlapping the line where the teeth mesh.

8. In mechanism of the character described, a driven member having peripheral cavities of frusto-conical shape opening through one end of said member, said end having a frusto-conical surface, a gear connected to the other member and having beveled teeth meshing with the teeth of said pinions, the inner ends of the teeth of the gear snugly engaging said frusto-conical surface, a fluid-confining element embracing said gear and overlapping the line where the teeth mesh, and a sleeve united with said gear, the fluid-confining element sliding on said sleeve, and a spring engaging the element for normally moving the same toward the gear.

9. In mechanism of the character described, a driving member, a driven member, a number of rotatable pinions carried by one of said members and having their axes radiating from a common center, a gear meshing with said pinions and operatively connected with the other member, and adjustable means arranged directly across the line of mesh of the teeth of the pinions and the gear, for limiting the exit of fluid from between said teeth.

10. In mechanism of the character described, a driving member, a driven member, a rotatable pinion carried by one of said members, a gear meshing with said pinion and operatively connected with the other member, and adjustable means arranged at the point where the teeth of the pinion and the gear mesh, for limiting the exit of the fluid at said point, at least one of said parts being fitted to another part with excessive clearance to permit a relatively high rate of leakage of the fluid for causing automatic reductive transmission as the load increases or decreases.

11. In mechanism of the character described, a driving member, a driven member, a rotatable pinion carried by one of said members, a gear meshing with said pinion and operatively connected with the other member, one of said members and the pinion and gear forming a spherical body, and adjustable means arranged about the periphery of the spherical body for limiting the exit of the fluid.

12. In mechanism of the character described, a driving member, a driven member, a rotatable bevel pinion carried by one of said members, a bevel gear meshing with said pinion and operatively connected with the other member, and adjustable means arranged at the point of outermost mesh of the teeth of the pinion and the gear, for limiting the exit of the fluid at said point.

13. In mechanism of the character described, a driving member, a driven member, a rotatable pinion carried by one of said members, a gear meshing with said pinion and operatively connected with the other member, one of said members and the pinion and gear forming a substantially spherical body, and an adjustable cup arranged at the point where the teeth of the pinion and the gear mesh for limiting the exit of fluid at said point, said cup having a parti-spherical inner surface conforming to said spherical body.

14. In mechanism of the character described, a driving member, a driven member, a rotatable pinion carried by one of said members, a gear meshing with said pinion and operatively connected with the other member, said gear, pinion and the member carrying said pinion forming a parti-spherical body, and adjustable means adapted to embrace said body to limit the exit of fluid from said body.

15. In mechanism of the character described, a driving member, a driven member, a rotatable pinion carried by one of said members, a gear meshing with said pinion and operatively connected with the other member, and adjustable fluid-confining means arranged with excessive clearance at the point where the teeth of the pinion and the gear mesh to permit a relatively high rate of leakage of the fluid for causing automatic reductive transmission as the load increases or decreases.

16. In mechanism of the character described, a driving member, a driven member, a rotatable pinion carried by one of said members, a gear meshing with said pinion and operatively connected with the other member, and adjustable fluid-confining means embracing with excessive clearance the ends of the teeth of the pinion and gear to permit a relatively high rate of leakage of the fluid for causing automatic reductive transmission as the load increases or decreases.

17. In mechanism of the character described, a pinion having an outer parti-spherical surface, and adjustable fluid-confining means having an inner parti-spherical surface adapted to receive said pinion surface.

In testimony whereof I affix my signature.

THOMAS F. LILLY.